(12) United States Patent
Yagudayev et al.

(10) Patent No.: US 7,816,813 B2
(45) Date of Patent: Oct. 19, 2010

(54) METHOD AND APPARATUS FOR PARALLEL ENGINE GENERATORS

(75) Inventors: Boris M. Yagudayev, Dumont, NJ (US);
Jack Petro, Florham Park, NJ (US);
Brian J. Escott, Sparrow Bush, NJ (US);
Kenneth D. Begauer, Dearborn, MI (US)

(73) Assignee: ASCO Power Technologies, L.P., Florham Park, NJ (US)

( * ) Notice: Subject to any disclaimer, the term of this patent is extended or adjusted under 35 U.S.C. 154(b) by 0 days.

(21) Appl. No.: 11/529,025

(22) Filed: Sep. 28, 2006

(65) Prior Publication Data

US 2008/0080104 A1    Apr. 3, 2008

(51) Int. Cl.
*H02J 7/00* (2006.01)
*H02J 9/00* (2006.01)
(52) U.S. Cl. ............................................. 307/64
(58) Field of Classification Search ............. 307/64, 307/84, 112
See application file for complete search history.

(56) References Cited

U.S. PATENT DOCUMENTS

| | | | | |
|---|---|---|---|---|
| 5,621,254 | A * | 4/1997 | Takeda et al. | 307/64 |
| 6,191,500 | B1 * | 2/2001 | Toy | 307/64 |
| 6,538,345 | B1 * | 3/2003 | Maller | 307/86 |
| 2006/0028069 | A1 * | 2/2006 | Loucks et al. | 307/130 |

FOREIGN PATENT DOCUMENTS

EP    1 006 641    6/2010

OTHER PUBLICATIONS

International Search Report issued by the European Patent Office in application serial No. PCT/US2007/079951.
Castenschiold, "Closed-Transition Switching of Essential Loads", IEEE Transactions on Industry Applications, IEEE Service Center, vol. 25, No. 3, May 1, 1989, pp. 403-407.
Hornack et al., "Automated Bus Transfer Control for Critical Industrial Processes", Proceedings of the Industrial and Commercial Power Systems Technical Conference. Detroit, Apr. 30-May 3, 1990.
http://www.generack.com/Industrial/Transfer_Switches, Mar. 19, 2010.
http://www.geindustrial.com/cwc/Dispatcher?REQUEST=PRODUCTS&pnlid-5&famid-40&catid-84&8d-epro, Mar. 19, 2010.
http://www.russelectric.com/UtilParaSw.htm, Mar. 19, 2010.

* cited by examiner

*Primary Examiner*—Jared J Fureman
*Assistant Examiner*—Carlos Amaya
(74) *Attorney, Agent, or Firm*—McDonnell Boehen Hulbert & Berghoff LLP

(57) ABSTRACT

A method and apparatus for paralleling engine generators. One or more closed transition transfer switches (CTTSes) are coupled to two or more engine generators. A system controller is programmed to operate the one or more CTTSes so that each of the generators provides an emergency power and so that the generators may simultaneously supply emergency power to the power bus.

11 Claims, 7 Drawing Sheets

METHOD AND APPARATUS FOR PARALLEL ENGINE GENERATORS

BACKGROUND

1. Field of the Invention

The present application is generally directed to a method and apparatus for operating at least two engine generators in parallel. More particularly, the present application is directed to a method and/or apparatus for operating a closed transition transfer switch (CTTS), such as those used in "make-before-break" emergency power applications, to enable parallel operation of at least two generators. However, aspects of the present application may be equally applicable in other scenarios as well.

2. Description of Related Art

A general diagram of a conventional engine generator paralleling system 10 is illustrated in FIG. 1. The system 10 may be used to power an emergency power bus 12 with three engine generators 13-15. As can be seen from FIG. 1, the system 10 comprises three separate circuit breakers 16-18 coupled to the power bus 12 and the generators 13-15. The power bus 12 is coupled to transfer switches 19-21. The transfer switches 19-21 are coupled to the power bus 12 at "emergency" positions 22-24. At "normal" positions 26-28, the transfer switches 19-21 are coupled to a utility bus 30, which is coupled to a utility power source 32 via a breaker 34. The transfer switches 19-21 are also coupled to load lugs 35-37. The utility power 32 supplies the load lugs 35-37 when the transfer switches 19-21 are each toggled respectively to the positions 26-28. Toggling generally refers to a transfer switch automatically changing between a "normal" and an "emergency" position and vice versa. For example, a transfer switch control panel (not shown) may automatically sense when the transfer switches 19-21 should be toggled. The master control 40 will then receive a signal from the control panel and accordingly toggle the transfer switches 19-21.

To supply power from the generators 13-15, the transfer switches 19-21 should each be toggled to the positions 22-24. The master controller 40 may be configured to shed lower priority loads or add higher priority loads to the emergency system, which may depend on available generator kW capacity. Typically, a generator system is designed so that the emergency power does not damage any loads. (see, for example, paragraph 6.3 of National Fire Protection Association standard 110).

The master controller 40 is also coupled to generator controllers 43-45, which are each coupled to the circuit breakers 16-18. When the utility power 32 fails, the master controller 40 initiates the startup of each of the generators 13-15. When at least one of the generators is at a suitable power, the master controller 40 closes at least one of the breakers 16-18 and at least one of the switches 19-21. The master controller 40 may provide more power to the power bus 12 by closing additional breakers. Before closing an additional breaker, the master controller may wait until the next generator is synchronized with the power bus 12 (i.e., the next generator matches the frequency and voltage phase angle of the other generators connected to the power bus).

Generally speaking, the system 10 and similar systems are usually custom designed and built, and due to complexity, they are comparatively more expensive than non-parallel systems. The costly nature of such systems may be attributed to installation and maintenance costs. For example, the paralleling circuit breakers 16-18, transfer switches 19-21, and controllers 43-45 are individual components, each of which must be installed and maintained separately, making paralleled systems more costly relative to typical non-paralleled systems To reduce system costs, emergency power systems may include a pre-packaged solution that reduces design and installation costs. For example, one type of pre-packaged solution includes a transfer switch that automatically monitors incoming power. Certain anomalies such as voltage sags, brownouts or swells may cause internal circuitry (within the transfer switch or a controller) to command a generator startup and then a transfer to the emergency generator when the generator has the proper voltage and frequency. When utility power returns, or certain other anomalies have occurred for a set time, the transfer switch will then transfer back to utility power and command the generator to turn off after another specified amount of "cool down" time.

A "break-before-make" transfer switch breaks power contacts with one source of power before it makes contact with another. In one arrangement, such a transfer switch prevents backfeeding from an emergency generator back into the utility line. One example is an open transition Automatic Transfer Switch (ATS).

FIG. 2 shows one arrangement illustrating a pre-packaged system 50 that includes "break-before-make," 2-position, ATSes 52, 54. The ATS 52 has an input 56 coupled to a generator 58 and an input 60 coupled to a generator 62. At a load output 64, the ATS 52 provides generator power to the ATS 54. In this arrangement, the ATS 52 may toggle between power supplied by the generators 58, 62 and the ATS 54 may toggle between the ATS 52 and a utility power source 64. However, when the ATS 54 is toggled to receive emergency power, both of the generators 58, 62 cannot provide power simultaneously to a load lug 66.

SUMMARY

Thus, it is desirable to provide a paralleling method and system that may be provided as a pre-packaged or single-package solution. Therefore, a method of paralleling engine generators is presented. The presented method may be a single-package solution, enabling multiple, paralleled engine generators to provide power to an emergency power bus. In addition, and as a consequence of being a single-package solution, installation and maintenance costs associated with a paralleling system may be reduced.

An exemplary method includes providing a closed transition transfer switch (CTTS) and a controller. The controller is communicatively coupled with the CTTS so that the controller uses the CTTS to route a first emergency power to a power bus. To parallel additional power, the controller further uses the CTTS to route a second emergency power to the power bus. As a further example, before routing the second power, the controller may wait for a frequency associated with the second power to match an output power. In one example, the power bus may be coupled to an emergency power input of an ATS.

An exemplary circuit is also described, such an exemplary circuit may include a CTTS coupled to a system controller. In one arrangement, the CTTS may include one input for coupling to a first generator, a second input for coupling to a second generator, and a load output for coupling to a power bus. The system controller, on the other hand, may include a central processing unit (CPU) that is programmed to direct the first and second inputs to be routed to the power bus. The CPU may include switching instructions that direct the system controller to wait until an output voltage waveform (frequency and phase angle) of the second generator is matched with an output voltage waveform of the first generator before routing the second input to the power bus.

An alternative method includes providing a CTTS having a first input coupled with a first generator, a second input coupled with a second generator, and a load output coupled to an emergency power input of a transfer switch. In the alternative method, the first CTTS is toggled so that the first generator supplies a first power to the emergency power input. The transfer switch is toggled so that the first generator begins supplying the first power to a circuit load. The second generator synchronizes with the circuit load and the CTTS is once again toggled so that the second power is also supplied to the circuit load. In one example, the transfer switch is an ATS. In another example, the transfer switch comprises a second CTTS.

These as well as other advantages of various aspects of the presently disclosed methods and apparatus will become apparent to those of ordinary skill in the art by reading the following detailed description, with appropriate reference to the accompanying drawings.

BRIEF DESCRIPTION OF THE DRAWINGS

Exemplary embodiments are described herein with reference to the drawings, in which.

DETAILED DESCRIPTION

Figure 1:
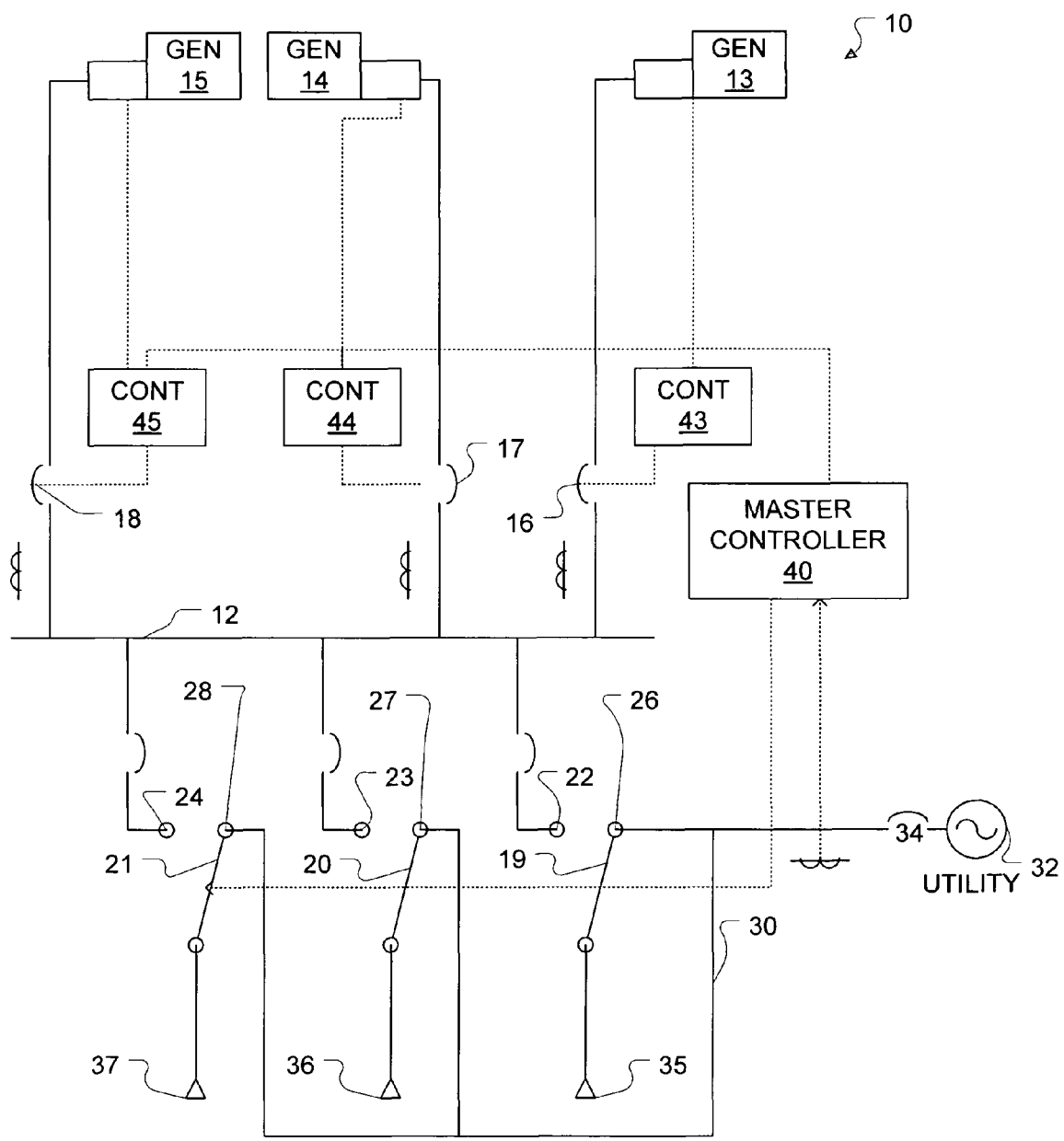
FIG. 1 is a schematic diagram of a typical prior art emergency power system.
Figure 2:
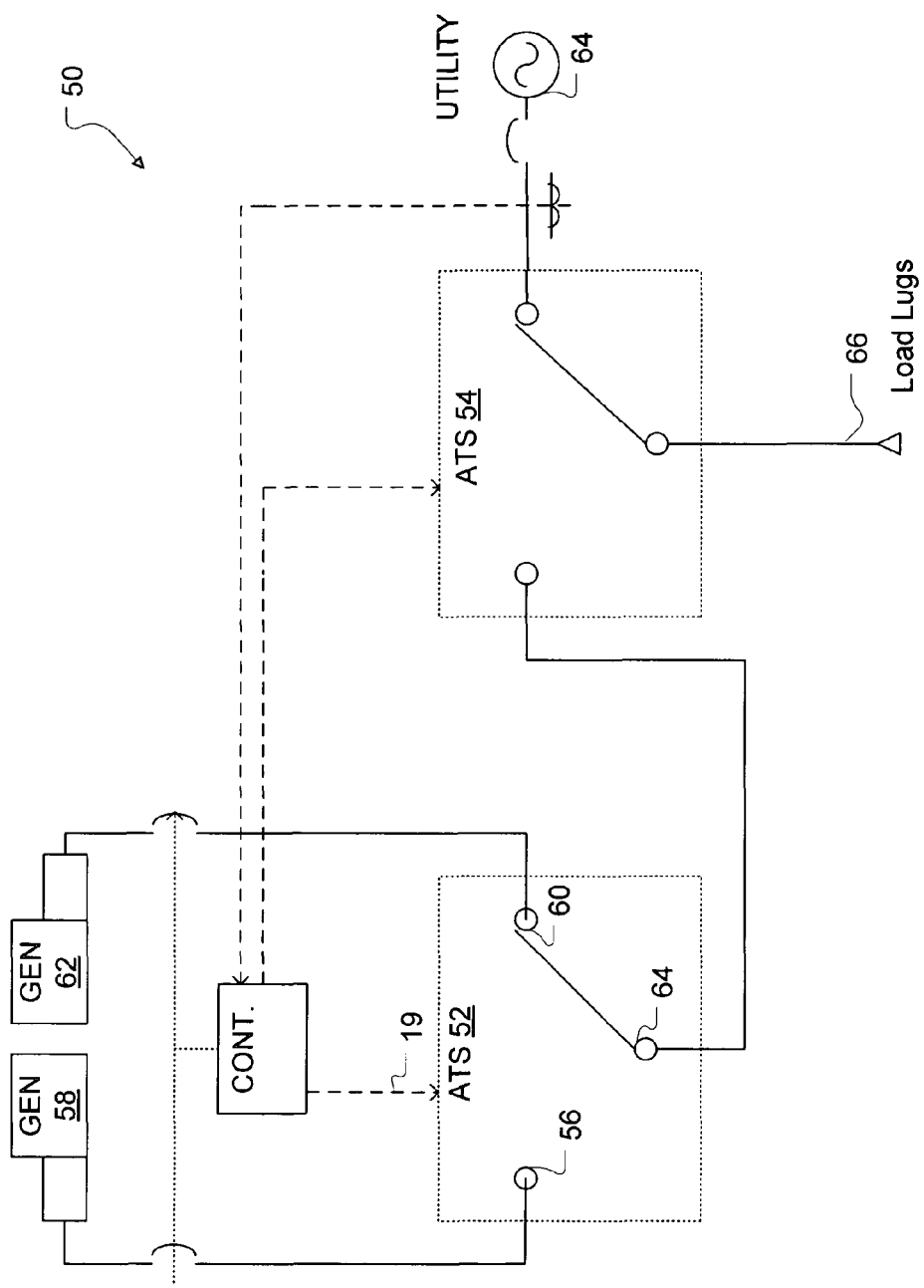
FIG. 2 is a schematic diagram of a typical pre-packaged prior art emergency power system.
Figure 3A:
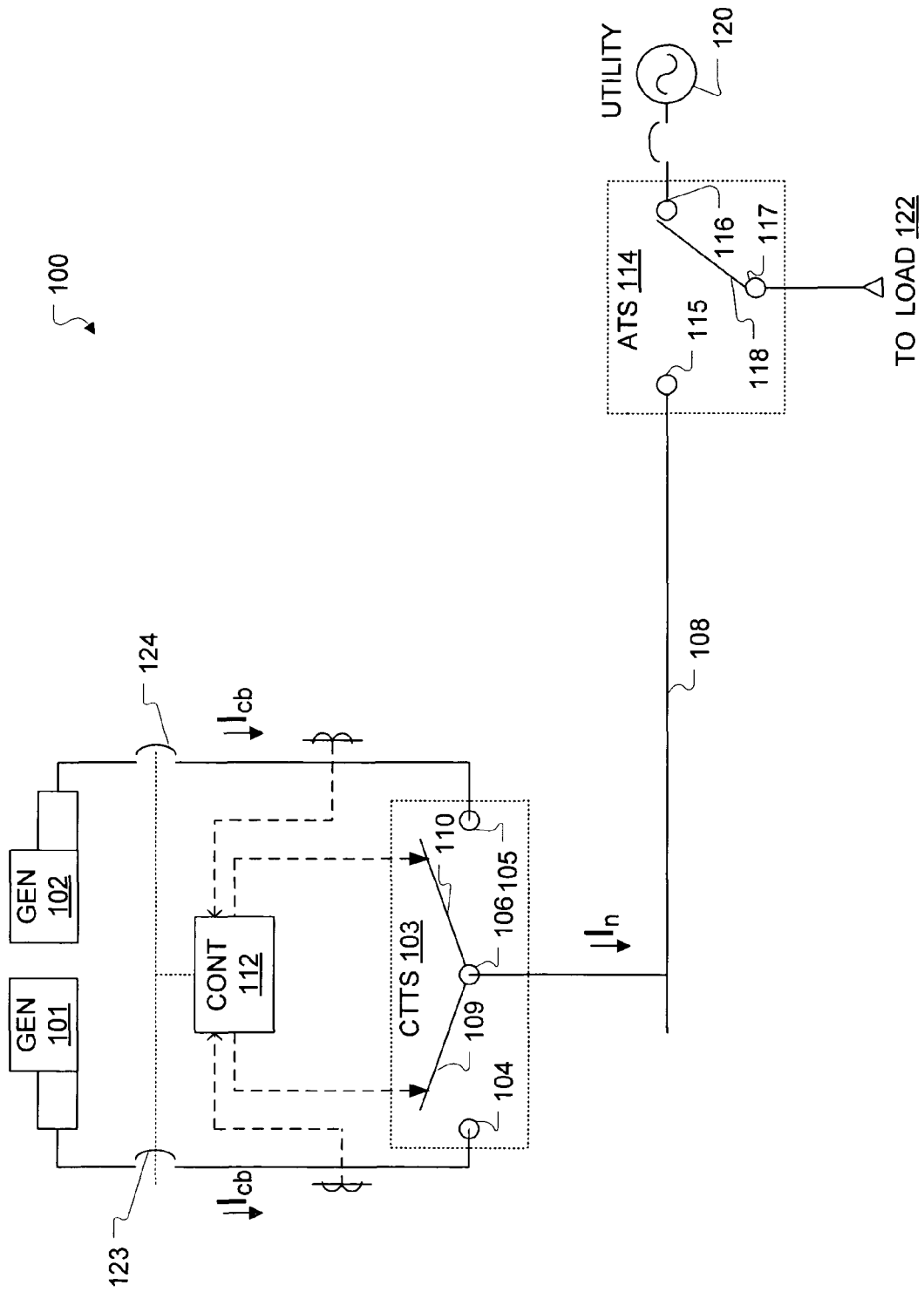
FIG. 3A is a schematic diagram of an emergency power system that uses a CTTS for paralleling two engine generators.

Turning now to the Figures, FIG. 3A is a schematic diagram of a first arrangement of an engine generator paralleling system 100. The system 100 comprises engine generators 101, 102 coupled to a CTTS 103. The CTTS 103 includes input terminals 104, 105, which are respectively coupled to receive a first power from the generator 101 and a second power from the generator 102. The CTTS 103 also includes a load output 106 that is coupled to a power bus 108. Within the CTTS 103 are switches 109, 110, that may be toggled so that each of the inputs 104, 105 may be routed to the load output 106. To open and close the switches 109, 110, the system 100 further includes a system controller 112 communicatively coupled to the CTTS 103.

Coupled to the power bus 108 is an ATS 114. The ATS 114 includes an emergency power input 115, a utility power input 116, a load output 117, and a switch 118. The input 115 is coupled to the power bus 108, the input 116 is coupled to a utility power source 120, and the load output 117 may be coupled to a circuit load 122. Generally speaking, the ATS 114 may comprise one of various types of transfer switches that "toggle" a utility power (supplied by the utility power source 120) and an emergency power (supplied by the generators 101, 102), where the CTTS 103 enables a paralleled power to be supplied to the input 115.

A CTTS is usually used in a "make-before-break" configuration. Typically, a controller will be coupled to a CTTS and programmed so that a CTTS routes emergency power to a power bus. The CTTS includes two switches for this purpose. One switch routes the emergency power to the power bus. The other switch is used to route utility power to the power bus. When utility power fails, for example, a controller will use the CTTS to route the emergency power (i.e., supplied by a generator) to the power bus by closing one switch (i.e., coupled to the generator) and opening the other switch (i.e., coupled to the utility power). When utility power is regained, both switches remain closed for a finite amount of time that is on the order of milliseconds (typically 100 ms or less). After the finite amount of time expires, the controller causes the generator side switch of the CTTS to open. As the term implies, "make-before-break" describes how the switch restores power such that a CTTS retains both switches in a closed position so that the transition back from generator power to utility power will be provided with no power interruption to the load. The controller is programmed to insure that both switches remain closed for only a transitory amount of time, and thus prevent backfeeding of generator power to the utility side of a CTTS.

However, in contrast to conventional operation, the system controller 112 includes a central processing unit (CPU) (see FIG. 3E) that is programmed to carry out switching instructions that are tailored to using one or more CTTSes for paralleling two or more generators.

Figure 3B:
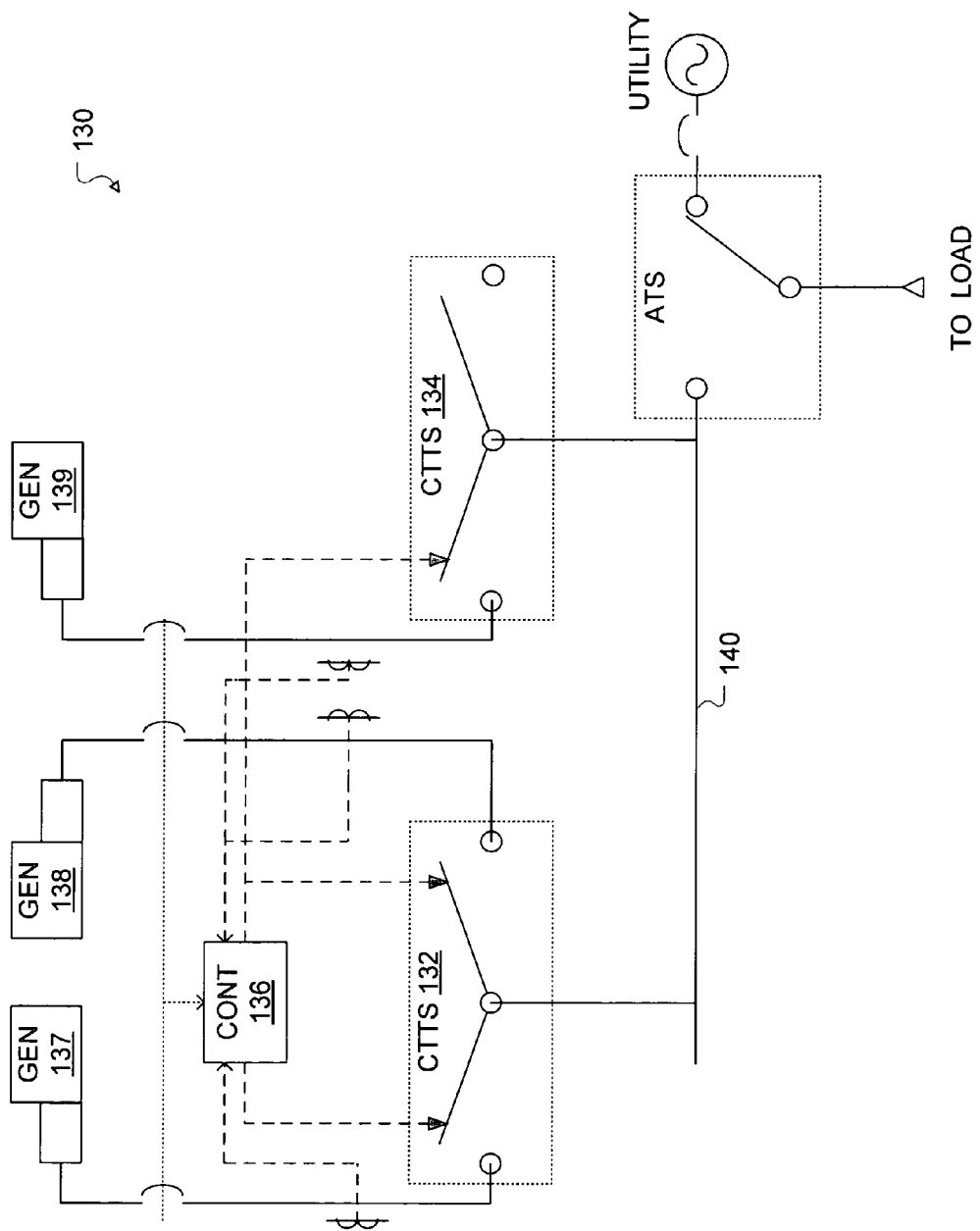
FIG. 3B is a schematic diagram of an emergency power system that uses two CTTSes for paralleling three engine generators.
Figure 3C:
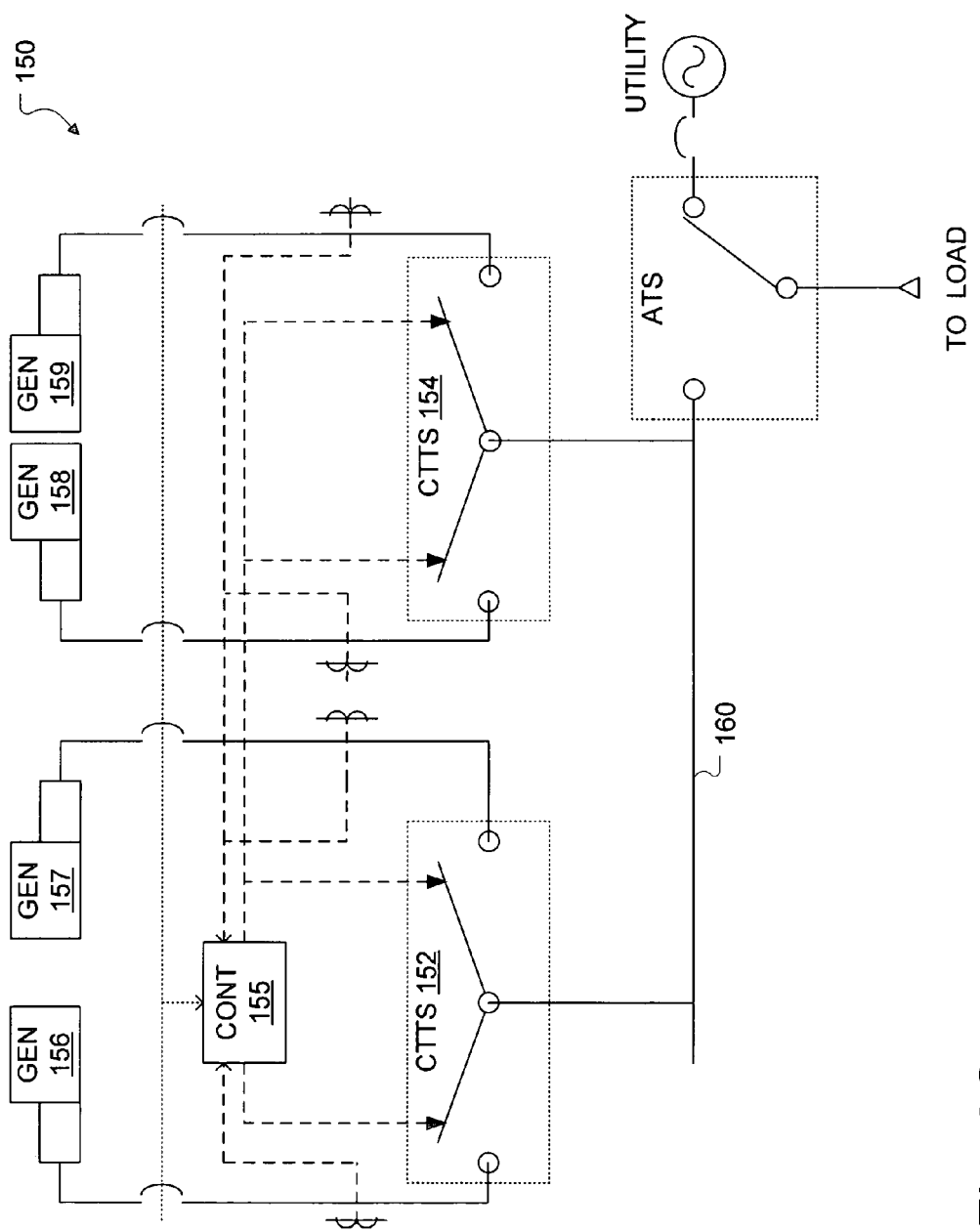
FIG. 3C is a schematic diagram of an emergency power system that uses two CTTSes for paralleling four engine generators.
Figure 3D:
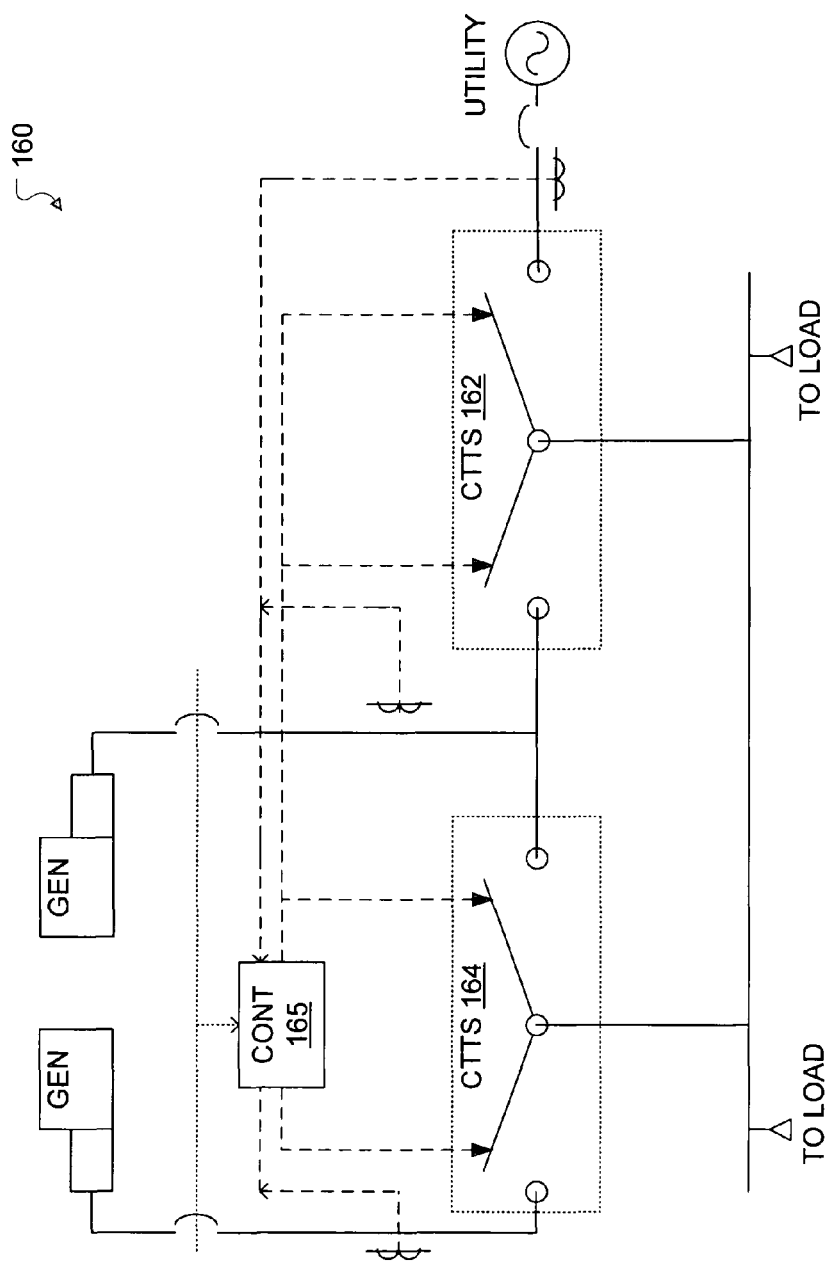
FIG. 3D is a schematic diagram of an emergency power system that uses two CTTSes for paralleling two engine generators.
Figure 3E:
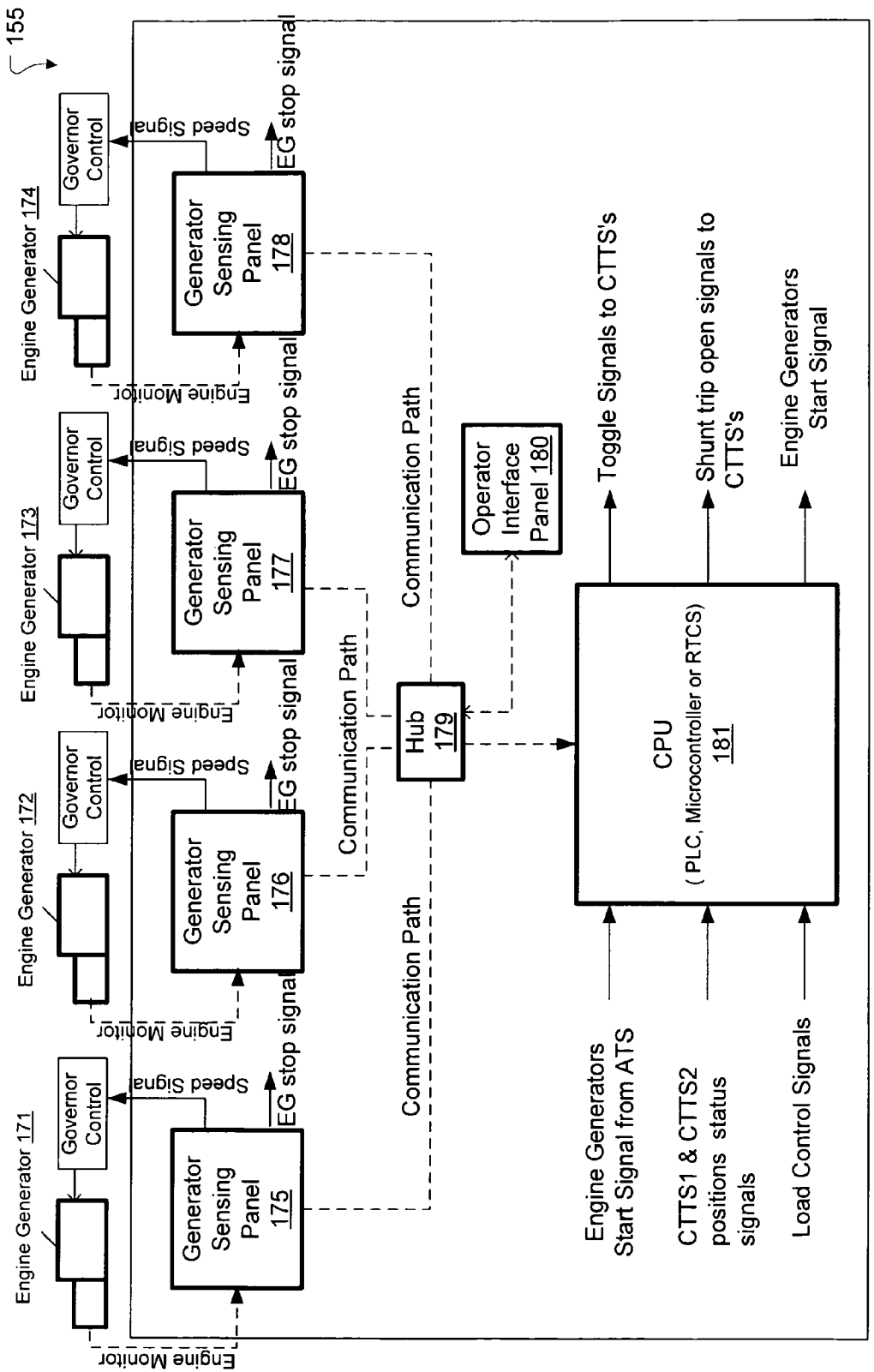
FIG. 3E is a block-diagram of a system controller for paralleling four engine generators using two CTTSes.

For example, FIG. 3E shows a block-diagram of a system controller 155 for paralleling four engine generators by using two CTTSes. The system controller 155 contains the following components: generator sensing panels 175-178, which each typically include automatic synchronizers, power measurements with protective relays, load sharing and multiple-circuit interlock circuitry, and communication ports; communication hub 179; operator interface panel 180; and CPU 181, which may comprise a programmable logic controller (PLC), microcontroller, or real time clock system (RTCS), for example.

In particular, the CPU 181 is configured so that two or more generators may be routed to a power bus 108 and so that two or more generators may supply power to a power bus. Furthermore, and also in contrast to a conventional arrangement of a CTTS, both inputs of a CTTS are coupled to receive power from a generator.

Returning to FIG. 3A, the system 100 provides emergency power from the generators 101, 102 when the utility power source 120 fails at the normal side (i.e., the input 116) of the ATS 114. When the utility power fails, the generators 101, 102 will initiate, or turn on. When at least one of the generators 101, 102 is at a nominal voltage (e.g., about at least 90% voltage and frequency level), either the input 104 or the input 105 connect to the power bus 108. For example, if the generator 101 reaches the nominal voltage level before the generator 102, the controller 112 will close the switch 109 at the input 104. An ATS controller (not shown), by sensing alternative power source availability, will automatically toggle switch 118 to the input 115. The system controller 112 may then provide feedback to the generator 102 so that the generator 102 synchronizes with the power bus 108 or the circuit load 122. Then, the system controller 112 may close the switch 110 so that the generator 102 is paralleled with the generator 101.

If the generators 101, 102 output substantially the same current, the maximum full load current flowing through generator power circuit breakers 123, 124 will be equal to the following value:

$$I_{cb} = 0.5 \cdot I_n$$

where $I_{cb}$ is a full load current flowing through each of the generator circuit breakers 123, 124 and $I_n$ is a nominal current rating of the CTTS 103. Considering the relationship between $I_{cb}$ and $I_n$ above, the maximum kW size of each of the generators 101, 102 to be paralleled by the CTTS 103 may be calculated by the following formula:

$$P\max = (0.865 \cdot \cos\phi \cdot V \cdot I_n)/1000, \quad [\text{kW}]$$

where Cos $\phi$—is system power factor and V is system nominal voltage, (V). The power, or current provided by each of the generators 101, 102, may be tailored to satisfy the above formula.

It should also be noted that, in yet another arrangement, two or more CTTSes may be used to parallel more than two generators. FIG. 3B, shows an example engine paralleling system 130 comprising a CTTS 132, a CTTS 134, a system controller 136, and three engine generators 137-139. The generators 137, 138 are coupled to the CTTS 132 in a manner generally similar to that of FIG. 3A. However, the additional generator 139 is coupled to the CTTS 134. The system controller 136 is programmed so that the first of the generators 137-139 to reach a nominal voltage are connected to a power bus 140 through the CTTS 132 or the CTTS 134. Also similar to FIG. 3A, the system controller 136 may wait until the remaining generators match a voltage frequency and phase angle of an output voltage before paralleling each of the remaining generators.

FIG. 3C shows another exemplary engine paralleling system 150 comprising a CTTS 152, a CTTS 154, a system controller 155, and four engine generators 156-159. The system 150 is similar to the system 130 of FIG. 3B; however, the system controller 155 is programmed so that each of the generators 155-159 may be paralleled to a power bus 160. Those of ordinary skill in the art will recognize that alternative arrangements are also possible.

FIG. 3D shows an example engine paralleling system 160 having a second CTTS 162 in lieu of an ATS. In the system 160, a CTTS 164 may be used for paralleling two or more engine generators, and the CTTS 162 may be used to transfer between a utility power source and an emergency power supplied by the generators. The system 160 also includes a system controller 165.

Varieties of examples have been described above. More generally, those skilled in the art will understand that changes and modifications may be made to these examples without departing from the true scope and spirit of the present invention, which is defined by the claims. Thus, for example, the configurations shown in FIGS. 3A-D may vary, comprising additional or substituted circuit elements. For instance, FIGS. 3A-D illustrate various breakers used to couple generator and utility power sources to a CTTS, it should be understood, however, that these types of components may be modified or omitted. Furthermore, although the presented system controllers (e.g., the controllers 112, 136, 155 and 165) are described as comprising a CPU, it should be understood that other types of memory and processor arrangements may be used to store program instructions directed to using a CTTS for paralleling an engine generator.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method for controlling a first and a second emergency generator, the method comprising the steps of:
   providing a system controller comprising a central processing unit (CPU) programmed to control the first and second emergency generator;
   coupling the system controller to a first dual operated transfer switch (TS) for controlling the operation of the first and the second emergency generator;
   utilizing the first dual operated TS to route a first emergency power from the first emergency generator to a common power bus, wherein the common power bus is provided between the first dual operated TS and an automatic transfer switch (ATS); and
   utilizing the system controller and the first dual operated TS to route a second emergency power from the second emergency generator to the common power bus while the first emergency power from the first emergency generator is also supplied to the common power bus.

2. The method as in claim 1, further comprising the step of:
   waiting for an output voltage waveform of the second emergency power to match with a voltage waveform associated with an output power before the system controller uses the first dual operated TS to route the second emergency power.

3. The method as in claim 1, further comprising the steps of:
   providing said automatic transfer switch (ATS) and
   utilizing an output power of the common power bus as an emergency power, wherein the common power bus is coupled to an emergency power input of said ATS.

4. The method as in claim 1, further comprising the step of:
   providing programmed instructions to the system controller for routing the first and second emergency powers.

5. The method as in claim 1, further comprising the step of:
   supplying the first emergency power from the first emergency generator; and
   supplying the second emergency power from the second emergency generator.

6. An apparatus for controlling a plurality of emergency generators, the circuit comprising:
   a first dual operated transfer switch (TS) comprising:
      a first input for coupling to a first generator;
      a second input for coupling to a second generator;
      a load output for coupling to a common power bus; and
   a system controller comprising a central processing unit (CPU) programmed to control the first and the second generator and communicatively coupled with the first dual operated TS,
   wherein the system controller is programmed to route both of the first and second inputs to the common power bus so that both of the first and second inputs simultaneously supply power to the common power bus, wherein the common power bus is provided between the first dual operated TS and an automatic transfer switch (ATS).

7. The circuit as in claim 6, wherein the system controller is further programmed to wait for an output voltage waveform of the second generator to match with an output voltage waveform of the first generator before routing the second input to the common power bus.

8. The circuit as in claim 7, further comprising
a second TS, the TS comprising a first input coupled to the second input of the first dual operated TS, a second input for coupling to a utility power source, and a load output for coupling to the common power bus.

9. The apparatus of claim 6, wherein
the automatic transfer switch (ATS) comprises an emergency power input for coupling to the common power bus, a utility input for coupling to a utility power source, and a load output for coupling to the circuit load.

10. A method for controlling a first and a second emergency generator, the method comprising the steps of:
providing a first dual operated transfer switch (TS) comprising first and second inputs and a load output, wherein the first input is coupled to a first generator, the second input is coupled to a second generator, and the load output is coupled to an emergency power input of an automatic transfer switch (ATS) via a common power bus that is provided between the first dual operated TS and the ATS;
under operation of a system controller comprising a central processing unit (CPU) programmed to control the first and the second generators, toggling a first switch of the first dual operated TS so that the first generator supplies a first power to the common power bus;
the second generator matching a frequency associated with a power at the common power bus; and
toggling a second switch of the first dual operated TS so that the second generator supplies a second power to the common power bus.

11. The method as in claim 10, further comprising the step of providing a second dual operated transfer switch, the second dual operated transfer switch comprising a third and a fourth input and a load output, wherein the third input is coupled to a third generator, the fourth input coupled to a fourth generator, and the load output is coupled to the common power bus.

\* \* \* \* \*

UNITED STATES PATENT AND TRADEMARK OFFICE
CERTIFICATE OF CORRECTION

| | | |
|---|---|---|
| PATENT NO. | : 7,816,813 B2 | Page 1 of 1 |
| APPLICATION NO. | : 11/529025 | |
| DATED | : October 19, 2010 | |
| INVENTOR(S) | : Boris Yagudayev et al. | |

It is certified that error appears in the above-identified patent and that said Letters Patent is hereby corrected as shown below:

Title page, item (75) inventor, delete "Kenneth D. Begauer" and replace it with:

-- Kenneth D. Gebauer --

Signed and Sealed this
Eighteenth Day of January, 2011

David J. Kappos
*Director of the United States Patent and Trademark Office*